United States Patent
Smith et al.

(10) Patent No.: US 11,314,840 B2
(45) Date of Patent: Apr. 26, 2022

(54) THIN-LAYER WEBPAGE CLONING FOR OFF-LINE DEMONSTRATION

(71) Applicant: ADP, Inc., Roseland, NJ (US)

(72) Inventors: Jason Edward Smith, Lake Wells, FL (US); Ronald Clark Carey, Jr., Alpharetta, GA (US); Jamie Smith, Winter Haven, FL (US)

(73) Assignee: ADP, Inc., Roseland, NJ (US)

( * ) Notice: Subject to any disclaimer, the term of this patent is extended or adjusted under 35 U.S.C. 154(b) by 73 days.

(21) Appl. No.: 16/920,135

(22) Filed: Jul. 2, 2020

(65) Prior Publication Data

US 2022/0004594 A1    Jan. 6, 2022

(51) Int. Cl.
   *G06F 16/958* (2019.01)
   *G06F 40/154* (2020.01)
   *G06F 40/146* (2020.01)
   *G06F 8/38* (2018.01)

(52) U.S. Cl.
   CPC .......... *G06F 16/972* (2019.01); *G06F 40/146* (2020.01); *G06F 40/154* (2020.01); *G06F 8/38* (2013.01)

(58) Field of Classification Search
   None
   See application file for complete search history.

(56) References Cited

U.S. PATENT DOCUMENTS

| | | | |
|---|---|---|---|
| 2013/0054514 A1* | 2/2013 | Barrett-Kahn | G06F 16/9574 707/608 |
| 2017/0185612 A1* | 6/2017 | Kamadolli | H04L 67/02 |
| 2018/0041567 A1* | 2/2018 | Kidambi | H04L 67/06 |
| 2019/0065444 A1* | 2/2019 | Sitaraman | H04L 67/02 |
| 2019/0122225 A1* | 4/2019 | Sosna | G06F 16/986 |
| 2020/0026802 A1* | 1/2020 | Ni | G06F 16/9577 |
| 2020/0110644 A1* | 4/2020 | Sullivan | G06F 40/205 |
| 2021/0203713 A1* | 7/2021 | Broddle | G06F 3/0482 |

* cited by examiner

Primary Examiner — Nathan Hillery
(74) Attorney, Agent, or Firm — Yee & Associates, P.C.

(57) ABSTRACT

A computer implemented method, computer system, and computer program product are provided for cloning a webpage. Webpage assets for a webpage are received. Using the webpage assets, the webpage is rendered for display within a graphical user interface of a webpage cloning system. Responsive to rendering the webpage, a thin-layer clone of the webpage as rendered for display in the graphical user interface is recorded. An off-line demonstration of the webpage is then generated from the thin-layer clone.

18 Claims, 6 Drawing Sheets

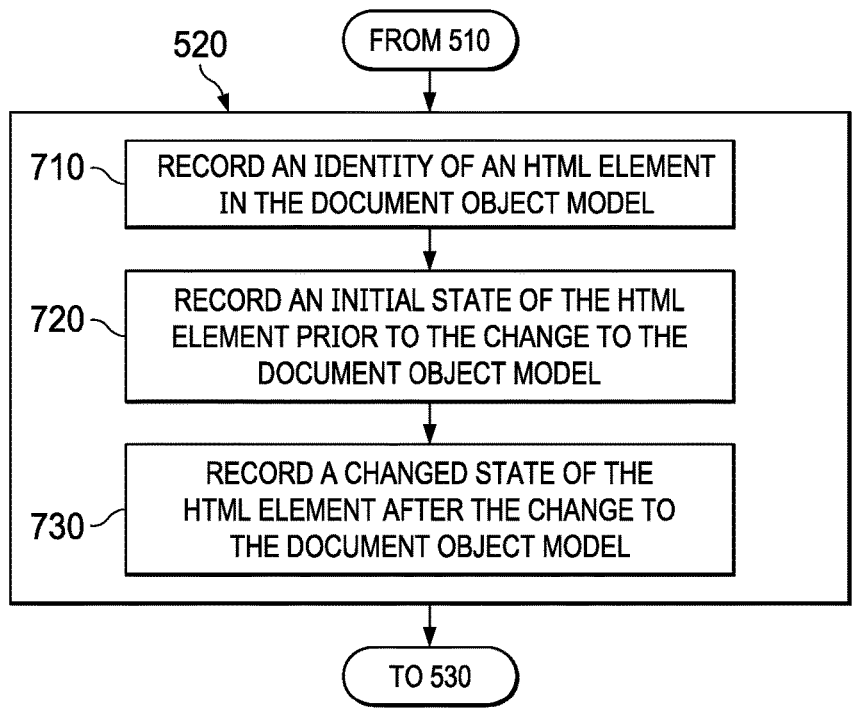
FIG. 7
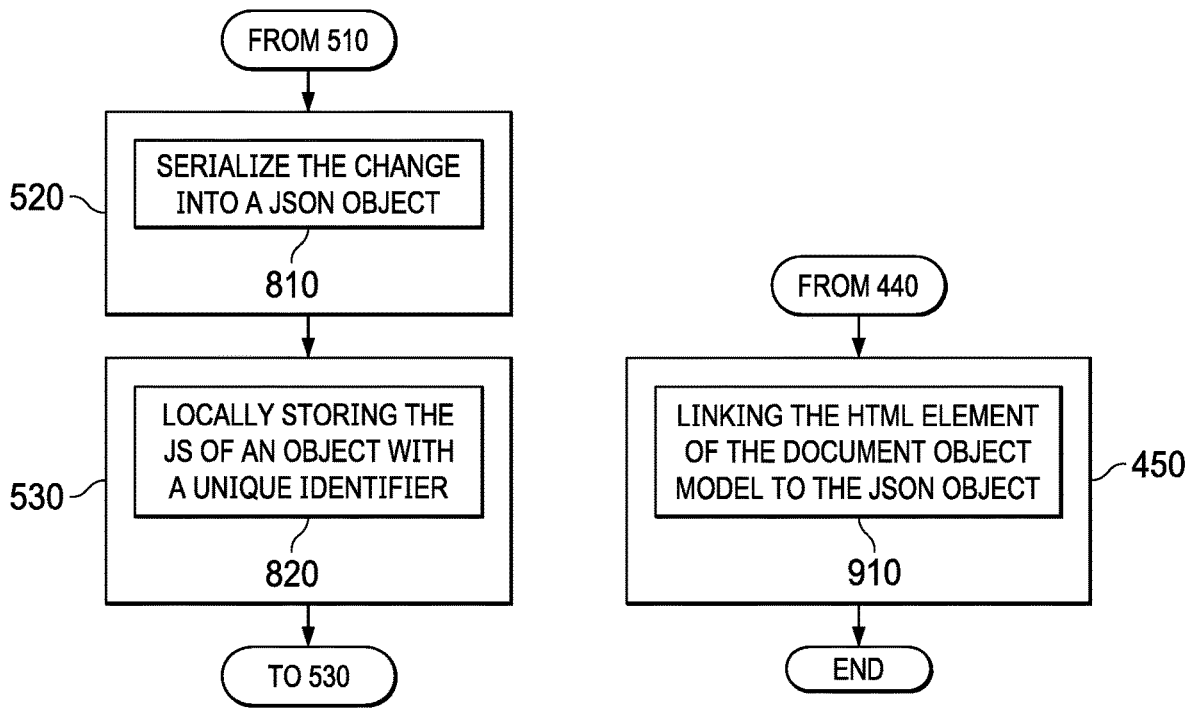
FIG. 8
FIG. 9

THIN-LAYER WEBPAGE CLONING FOR OFF-LINE DEMONSTRATION

BACKGROUND INFORMATION

1. Field

The present disclosure relates generally to an improved computer system and, in particular, to improve methods for creating and using software product demonstrations, and, even more particularly, to improved methods to clone a webpage for implementing off-line demonstrations of the webpage.

2. Background

Off-line demonstrations are often created to intrinsically emulate live products, including webpages. These demonstrations can be run off-line, to re-create the live products in an off-line environment without having to retrieve online resources.

Known methods of creating off-line demonstrations involve a scraping process of the live webpage, where all assets, source code procedures, and algorithms necessary to re-create the webpage are retrieved from the live servers. Using the scraped assets, a demonstration can then be run off-line as an emulated clone of the live webpage.

This emulation process faithfully re-creates all internal parts, structure, processes, and inter-communications of the live webpage, but involves a significant overhead to build and maintain the off-line demonstration. The scraping process retrieves numerous files, many of which are unnecessary for off-line demonstrations, resulting in a heavier and more complex demonstration than may be desired. The weight and complexity of demonstration negatively impacts build times, install times, upload and download, and run-time, all of which may be longer than desired.

Furthermore, faithfully re-creating live webpage in a simulated off-line demonstration may involve numerous software frameworks. These multiple environments create a talent bottleneck and learning curve, as developers of the demonstration are required to be comfortable working within each of these software frameworks to maintain demos that are emulated.

The deficiencies of known scraping processes therefore lead to a longer development time of the demonstration. A longer development time delays release of the final product.

Therefore, it would be desirable to have a method and apparatus that take into account at least some of the issues discussed above, as well as other possible issues. For example, it would be desirable to have a method and apparatus that overcome a technical problem of cloning a webpage that make creating an off-line demonstration more cumbersome and time-consuming than desired.

SUMMARY

An embodiment of the present disclosure provides a webpage cloning system comprising a computer system and a thin-layer cloning in the computer system. The webpage cloning system operates to receive webpage assets for a webpage. The webpage cloning system operates to render the webpage within a graphical user interface of a webpage cloning system. In response to rendering the webpage, the webpage cloning system operates to record a thin-layer clone of the webpage as rendered in the graphical user interface. The webpage cloning system operates to locally store the thin-layer clone. The webpage cloning system operates to generate an off-line demonstration of the webpage, wherein the off-line demonstration is generated from the thin-layer clone.

Another embodiment of the present disclosure provides for a method for cloning a webpage. A computer system receives webpage assets for a webpage. The computer system renders the webpage within a graphical user interface of a webpage cloning system. In response to rendering the webpage, the computer system records a thin-layer clone of the webpage as rendered in the graphical user interface. The computer system locally stores the thin-layer clone. The computer system generates an off-line demonstration of the webpage, wherein the off-line demonstration is generated from the thin-layer clone.

Still another embodiment of the present disclosure provides a computer program product for providing visual verification of electronic data, the computer program product comprising a computer readable storage media with program code stored on the computer-readable storage media. The program code includes instructions for receiving webpage assets for a webpage. The program code includes instructions for rendering the webpage within a graphical user interface of a webpage cloning system. The program code includes instructions for recording a thin-layer clone of the webpage as rendered in the graphical user interface. The recording is performed in response to rendering the webpage. The program code includes instructions for locally storing the thin-layer clone. The program code includes instructions for generating an off-line demonstration of the webpage. The off-line demonstration is generated from the thin-layer clone.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 7 is a flowchart of a second process for recording a change to a document object model in accordance with an illustrative embodiment;

FIG. 8 is a flowchart of a second process for recording a change to a document object model in accordance with an illustrative embodiment;

FIG. 9 is a flowchart of a process for generating an off-line demonstration of a webpage in accordance with an illustrative embodiment.

DETAILED DESCRIPTION

The illustrative embodiments recognize and take into account a number of different considerations. For example, the illustrative embodiments recognize and take into account that it would be desirable to have a method, apparatus, system, and computer program product that take into account at least some of the issues discussed above, as well as other possible issues. For example, it would be desirable to have a method and apparatus that overcome an issue with the production of off-line simulations of online webpages that make creating an off-line demonstration using known systems more cumbersome and time-consuming than desired.

Thus, illustrative embodiments of the present invention provide a computer implemented method, computer system, and computer program product for cloning a webpage. Webpage assets for a webpage are received. Using the webpage assets, the webpage is rendered for display within a graphical user interface of a webpage cloning system. Responsive to rendering the webpage, a thin-layer clone of the webpage as rendered for display in the graphical user interface is recorded. An off-line demonstration of the webpage is then generated from the thin-layer clone.

Figure 1:
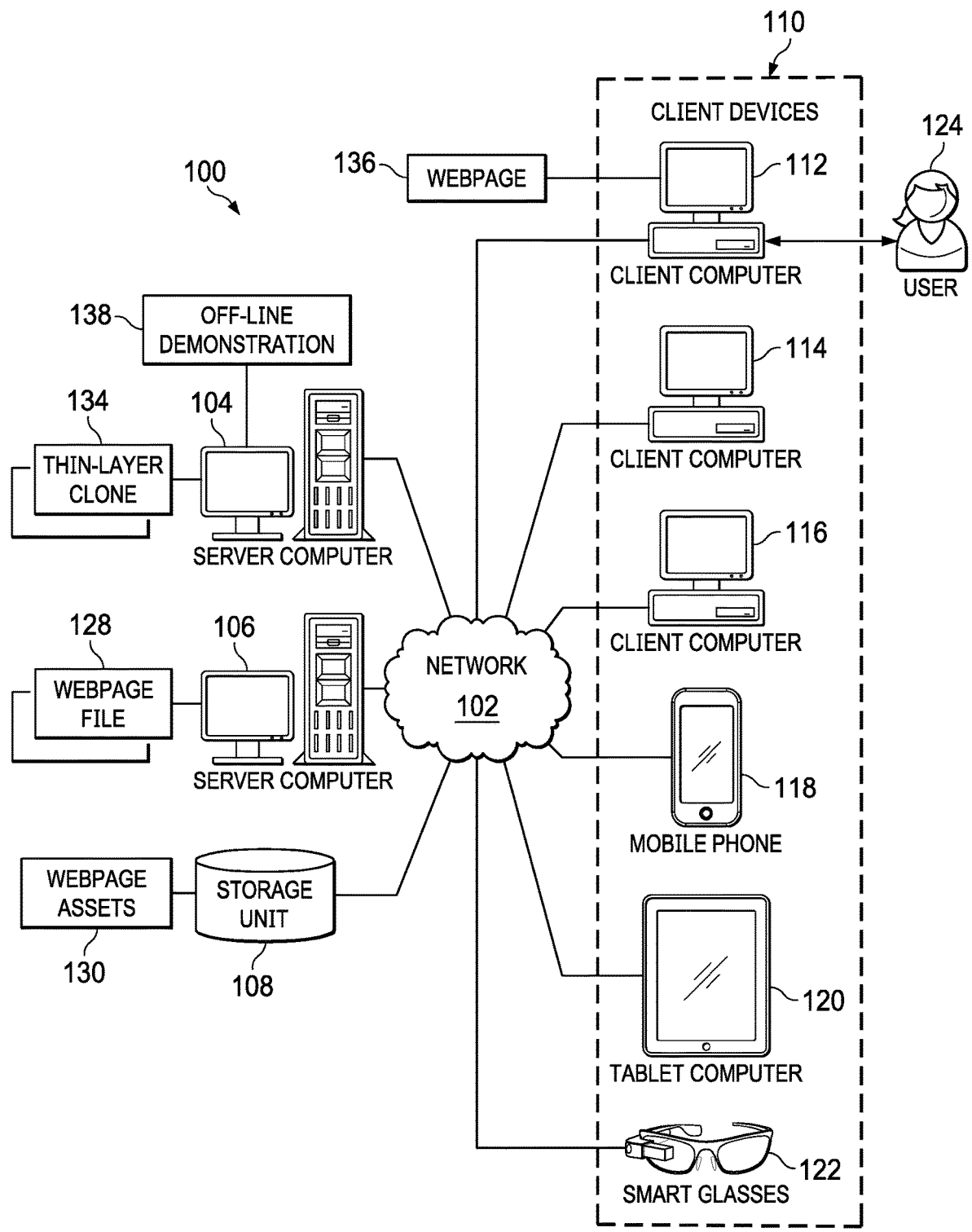
FIG. 1 is a pictorial representation of a network of data processing systems in which illustrative embodiments may be implemented.

With reference now to the figures and, in particular, with reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client devices 110 connect to network 102. As depicted, client devices 110 include client computer 112, client computer 114, and client computer 116. Client devices 110 can be, for example, computers, workstations, or network computers. In the depicted example, server computer 104 provides information, such as boot files, operating system images, and applications to client devices 110. Further, client devices 110 can also include other types of client devices such as mobile phone 118, tablet computer 120, and smart glasses 122. In this illustrative example, server computer 104, server computer 106, storage unit 108, and client devices 110 are network devices that connect to network 102 in which network 102 is the communications media for these network devices. Some or all of client devices 110 may form an Internet-of-things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

As used herein, "a number of," when used with reference to items, means one or more items. For example, "a number of different types of networks" is one or more different types of networks.

Further, the phrase "a set of" or "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

In this illustrative example, user 124 at client computer 112 can interact with webpage cloning system 126 to clone webpage 136. Webpage cloning system 126 is an integrated development environment used for cloning webpages, such as webpage 136, and user interactions on the webpage for off-line browsing. Webpage cloning system 126 links pages into a workflow and simulates interactions on the page. In this manner, webpage cloning system 126 can create off-line demonstration 138 that mimic the behaviors of the live product.

In this illustrative example, webpage cloning system 126 receives webpage assets 130 for webpage 136. For example, webpage cloning system 126 can make a request for webpage 136. The request can be, for example, a hypertext transfer protocol (HTTP) request. The request can be initiated by user 124 interacting with a browser at client computer 112. In this illustrative example, the browser is a software application for accessing information on network data processing system 100. For example, the browser can retrieve content from a server computer, such as server computer 104 hosting Web server 132, and display the information on client computer 112. In this illustrative example, the browser can be, for example, a web browser.

In this illustrative example, webpage file 128 is located on web server 132. Webpage file 128 may be a hypertext markup language (HTML) file, but may not include webpage assets 130 that are necessary to render and display a finalized webpage.

After receiving webpage file 128, webpage cloning system 126 parses webpage file 128 to identify webpage assets 130 that may be referenced therein. Thereafter, webpage cloning system 126 requests webpage assets 130 from web server 132.

Webpage cloning system 126 uses webpage file 128 and webpage assets 130 to create thin-layer clone 134. Thin-layer clone 134 provides a snapshot of a post-rendered webpage 136. Thin-layer clone 134 is not an image file. Rather, thin-layer clone 134 is integrated HTML document that incorporates elements from webpage file 128 and webpage assets 130 that are used by a browser to render and display webpage 136. For example, thin-layer clone 134 can include any HTML, images, CSS, and JavaScript, as well as other static assets that may assist in the layout and styling of webpage 136.

Thin-layer clone 134 can then be wired-up within webpage cloning system 126 to generate off-line demonstration 138 that mimics the interactions performed in an online version of webpage 136. As a result, and off-line replica of life webpages can be generated based on webpage cloning system 126 using thin-layer clone 134 to provide the resources necessary to generate an off-line clone of webpage 136.

In the illustrative example in this figure, webpage cloning system 126 receives webpage assets 130 for webpage 136. Webpage cloning system 126 renders webpage 136 within a graphical user interface of webpage cloning system 126. Responsive to rendering webpage 136, webpage cloning system 126 records thin-layer clone 134 of webpage 136 as rendered in the graphical user interface. Webpage cloning system 126 locally stores thin-layer clone 134. Webpage cloning system 126 generates an off-line demonstration 138 of webpage 136, wherein off-line demonstration 138 is generated from thin-layer clone 134.

Further, because thin-layer clone 134 provides resources necessary to generate an off-line clone of webpage 136, webpage cloning system 126 overcomes a technical problem of creating off-line demonstration 138, including reducing the overhead to build and maintain off-line demonstration 138 of webpage 136. In one illustrative example, off-line demonstration 138 providing an emulation that faithfully mimics the structure and processes of webpage 136, but without requiring online retrieval of webpage assets. Furthermore, off-line demonstration 138 built from thin-layer clone 134 reduces the number of resources required by known systems using heavier and more complex demonstrations. In one illustrative example, generating off-line demonstration 138 built from thin-layer clone 134 enables an organization to more quickly and easily develop off-line simulations of online products, which can lead to shorter development times earlier releases of finalized online products.

Figure 2:
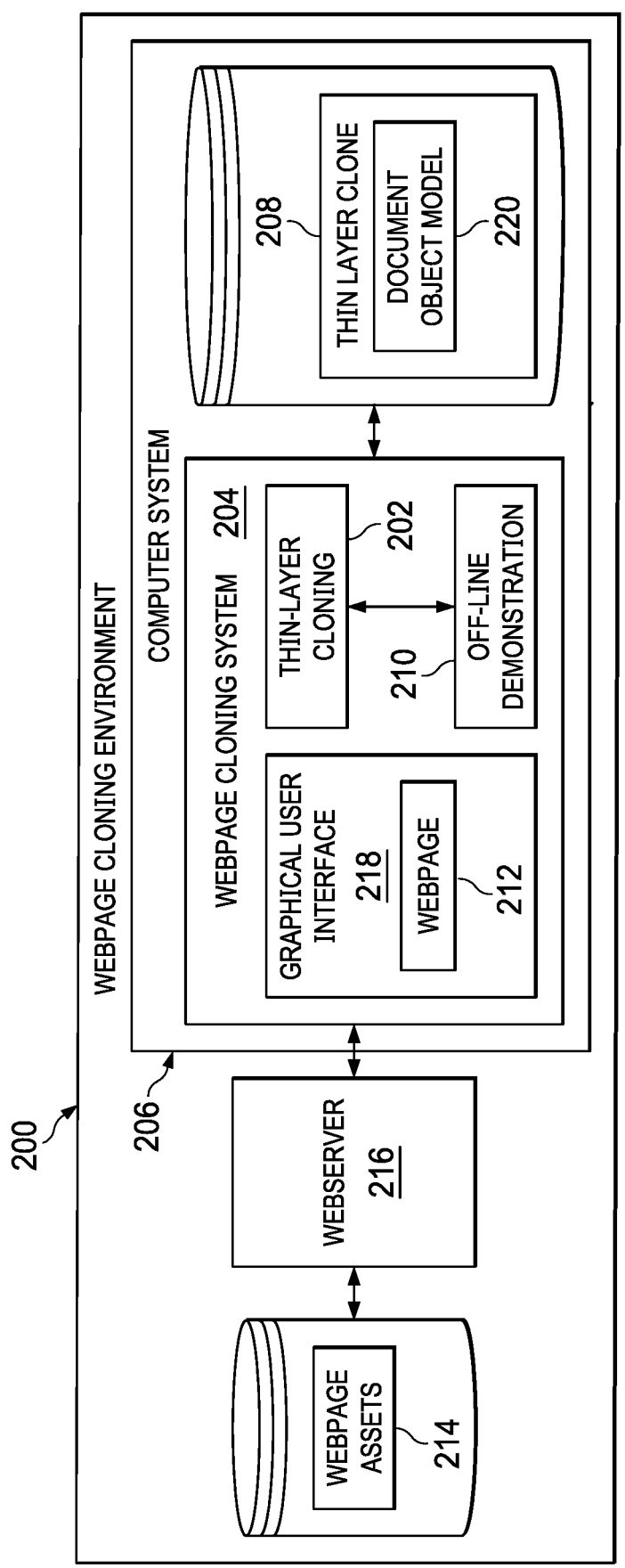
FIG. 2 is a block diagram of a webpage cloning environment in accordance with an illustrative embodiment.

With reference now to FIG. 2, a block diagram of a webpage cloning environment is depicted in accordance with an illustrative embodiment. In this illustrative example, webpage cloning environment 200 includes components that can be implemented in hardware such as the hardware shown in network data processing system 100 in FIG. 1. In this illustrative example, webpage cloning system 204 is an example of webpage cloning system 126 of FIG. 1.

As depicted, webpage cloning environment 200 is an environment in which thin-layer cloning 202 of webpage 212 enables webpage cloning system 204 in computer system 206 to generate off-line demonstration 210. In this illustrative example, webpage cloning system 204 operates to clone webpage 212.

Computer system 206 is a physical hardware system and includes one or more data processing systems. When more than one data processing system is present in computer system 206, those data processing systems are in communication with each other using a communications medium. The communications medium may be a network. The data processing systems may be selected from at least one of a computer, a server computer, a tablet, or some other suitable data processing system.

In this illustrative example, thin-layer cloning 202 and computer system 206 form webpage cloning system 204. In enabling webpage cloning system 204 to generate off-line demonstration 210, thin-layer cloning 202 can generate thin-layer clone 208 for use in providing off-line demonstration 210 of webpage 212 by webpage cloning system 204.

Thin-layer cloning 202 can be implemented in software, hardware, firmware, or a combination thereof. When software is used, the operations performed by thin-layer cloning 202 can be implemented in program code configured to run on hardware, such as a processor unit. When firmware is used, the operations performed by thin-layer cloning 202 can be implemented in program code and data and stored in persistent memory to run on a processor unit. When hardware is employed, the hardware may include circuits that operate to perform the operations in thin-layer cloning 202.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

In this illustrative example, webpage cloning system 204 receives webpage assets 214 for webpage 212. As depicted, webpage assets 214 are stored on a database, and can include any images, CSS, and JavaScript, as well as other resources, that are suitable resources. Webpage assets 214 can also include any HTML files, such as webpage file 128 of FIG. 1, which can alternatively be stored on Web server 216.

In this illustrative example, webpage cloning system 204 renders webpage 212 and displays webpage 212 on a graphical user interface 218 of webpage cloning system 204. Graphical user interface 218 provides a browser view (not shown) to display and manipulate webpage 212. Graphical user interface 218 can also provide an Integrated set of tools (not shown) that can be used to clone webpage 212, to record interactions, and to generate off-line demonstration 210.

In this illustrative example, webpage cloning system 126 creates thin-layer clone 208 of webpage 212. Webpage cloning system 126 records thin-layer clone 208 in response to rendering webpage 212.

Thin-layer clone 208 is a clone of webpage 212 as rendered in graphical user interface 218. Thin-layer clone 208 is not an image file. Rather, thin-layer clone 208 is integrated HTML document that incorporates elements from webpage assets 214 that are necessary to render and display webpage 212. In one illustrative example, thin-layer clone 208 comprises document object model 220 of webpage 212.

The Document Object Model (DOM) is an application programming interface (API) for valid HTML and well-formed XML documents. It defines the logical structure of documents and the way a document is accessed and manipulated. Document object model 220 specifies how webpage assets 214 are represented as objects by graphical user interface 218. document object model 220 encompasses not only the structure of webpage 212, but also the behavior of webpage 212 and the objects of which webpage 212 is composed. Document object model 220 is not merely a persistence of webpage assets 214. Rather, document object model 220 is an illustration of the logical relationships among webpage assets 214, as interpreted by webpage cloning system 204.

In this illustrative example, webpage cloning system 204 locally stores thin-layer clone 208. As depicted, thin-layer clone 208 can be stored in database 222.

In this illustrative example, webpage cloning system 204 generates off-line demonstration 210 of webpage 212. Off-line demonstration 210 is generated from thin-layer clone 208. For example, interactions with webpage 212 are recorded, encoded into a JSON file which is saved alongside of webpage 212. When thin-layer clone 208 is loaded in a simulation environment, a wire-up feature is applied to replay any of the recorded interactions.

In one illustrative example, one or more solutions are present that overcome an issue with the production of off-line simulations of online webpages. In other words, simulated demonstrations using thin-layer clones rely on simpler internal mechanisms to mimic live webpage interactions, and do not require replicating internal data structures or live sourcing of webpage assets. As a result, one or more solutions may provide an effect of enabling the creation of off-line demonstrations that mimic live webpage interactions, while also being light weight and less complex as compared to current techniques for creating off-line simulations of online webpages.

Thus, the illustrative examples can clone a webpage. As depicted, in the illustrative examples, webpage cloning system 204 receives webpage assets 214 for webpage 212. Webpage cloning system 204 renders webpage 212 within graphical user interface 218 of webpage cloning system 204. Responsive to rendering webpage 212, webpage cloning system 204 records thin-layer clone 208 of webpage 212 as rendered in graphical user interface 218. Webpage cloning system 204 locally stores thin-layer clone 208. Webpage cloning system 204 generates off-line demonstration 210 of webpage 212. Off-line demonstration 210 is generated from thin-layer clone 208.

Computer system 206 can be configured to perform at least one of the steps, operations, or actions described in the different illustrative examples using software, hardware, firmware, or a combination thereof. As a result, computer system 206 operates as a special purpose computer system in which thin-layer cloning 202 in computer system 206 enables creating off-line demonstration 210 that mimics live webpage interactions, while also being lightweight and less complex as compared to currently used techniques. In particular, thin-layer cloning 202 transforms computer system 206 into a special purpose computer system as compared to currently available general computer systems that do not have thin-layer cloning 202.

In the illustrative example, the use of thin-layer cloning 202 in computer system 206 integrates processes into a practical application for creating off-line demonstration 210 that increases the performance of computer system 206. In other words, thin-layer cloning 202 in computer system 206 is directed to a practical application of processes integrated into thin-layer cloning 202 in computer system 206 that creates off-line demonstration 210 from thin-layer clone 208 in off-line simulations can be executed with at least one of increased speed or efficiency. In other words, computer system 206 or some other computer system has increased speed or efficiency in running off-line simulations website 210 when using off-line demonstration 210 that utilize thin-layer clone 208.

Figure 3:
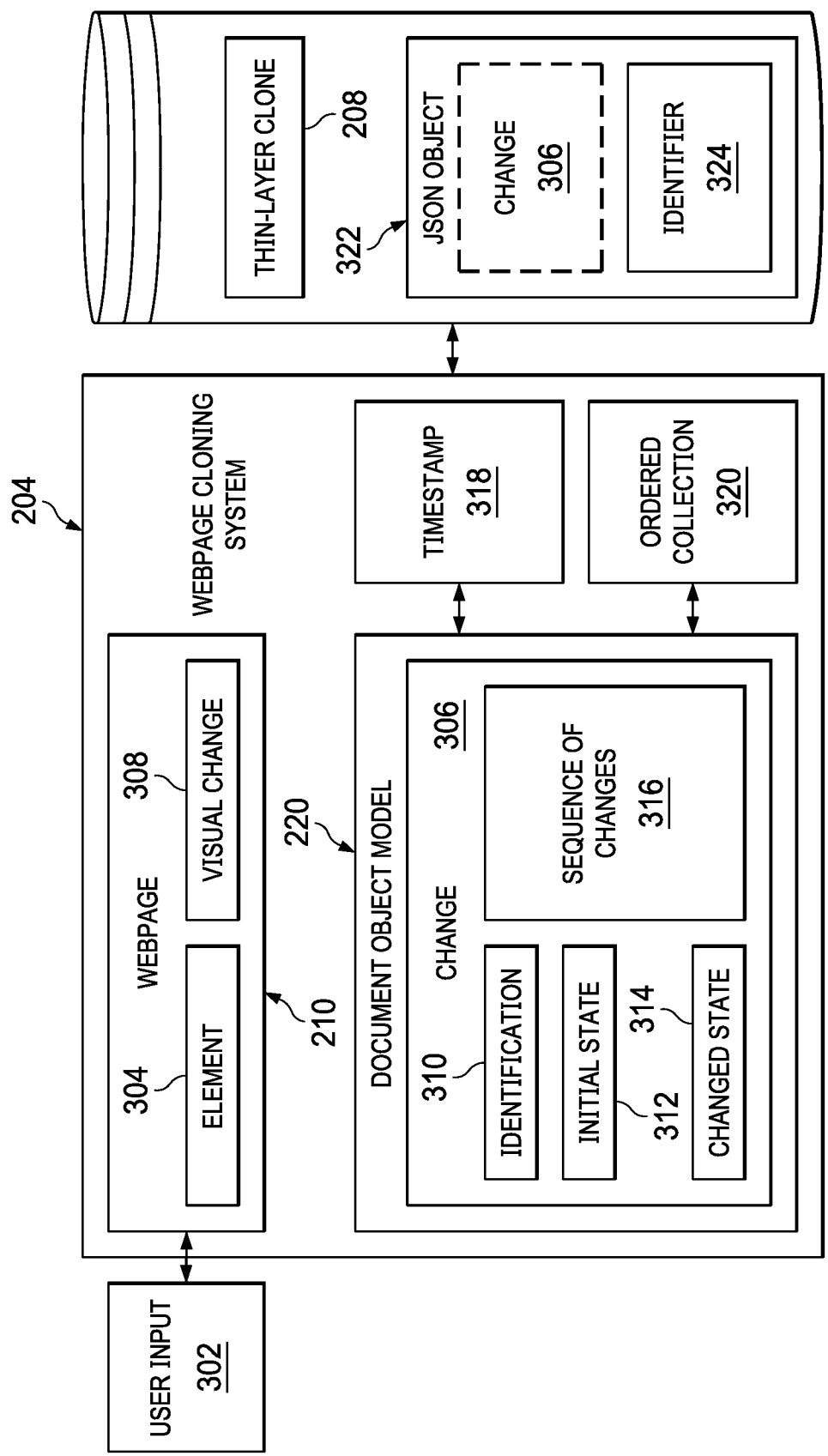
FIG. 3 is a data flow diagram illustrating data flow used to create a thin-layer clone of a webpage in accordance with an illustrative embodiment.

With reference next to FIG. 3, a data flow diagram illustrating data flow used to create a thin-layer clone of a webpage in accordance with an illustrative embodiment. In the illustrative examples, the same reference numeral may be used in more than one figure. This reuse of a reference numeral in different figures represents the same element in the different figures.

In one illustrative example, webpage cloning system 204 receives user input 302 interacting with element 304 of webpage 212. A user may interact with element 304 using one or more of user input device, such as a keyboard, a mouse, a graphical user interface (a physical display), a touch screen, a voice interaction, and any other suitable interface for interacting with the computer.

Element 304 is a graphical and/or functional element is an object on the screen that can be manipulated by the user to perform some action. Element 304 may be rendered in webpage 212 based on one or more webpage assets, such as webpage assets 214 of FIG. 2.

Interactions with element 304 produce change 306 to document object model 220. For example, change 306 can be added or removed nodes, attribute changes or changes in the text content of text nodes, as well as other changes to document object model 220.

Webpage 212 is re-rendered based on change 306 to document object model 220, producing visual change 308 to webpage 212. For example, a webpage may show animations, transitions, or any other kind of visual feedback when a user interacts with elements of the webpage. Each of these visual changes is caused by a change to the document object model. Even a simple visual change 308, such as opening a pop-up graphical overlay prompt or changing a color when hovering over element 304 might require a series of changes to the document object model. Each of these changes to the document object model may also be characterized as a "DOM mutation."

Webpage cloning system 204 includes an integrated set of tools (not shown) that enable a user to individually inspect element 304, and record any DOM mutation caused by an interaction with element 304. In one illustrative example, webpage cloning system 204 can use a web API, such as a mutation event or mutation observer, to identify change 306 to document object model 220.

In this illustrative example, webpage cloning system 204 records change 306 to document object model 220 caused by user input 302. Change 306 to document object model 220 produces visual change 308 to webpage 212. For example, using the integrated set of tools included with webpage cloning system 204, a user may focus or click on element 304, enabling the contextual recording of an interaction with element 304. Once the interaction finishes, the user can stop the recording.

In this illustrative example, webpage cloning system 204 locally stores change 306 separate from the thin-layer clone. Webpage cloning system 204 records change 304 as a data structure that provides an HTML level history of mutations of document object model 220. For example, webpage cloning system 204 can record change 306, including identification 310 of element 304 at an HTML level within document object model 220, and initial state 312 of element 304 in document object model 220, and changed state 314 of element 304 in document object model 220.

In one illustrative example, change 306 can be a sequence of changes 316. Webpage cloning system 204 records change 306 to document object model 220 by recording sequence of changes 316 to document object model 220.

Several or more mutations of document object model 220 may be required to produce visual change 308. For example, several or more mutations of document object model 220 may be required to open a pop-up overlay. Webpage cloning system 204 observes and records each of these mutations in sequence.

In this illustrative example, webpage cloning system 204 generates timestamp 318 for each change in sequence of changes 316. Webpage cloning system 204 then generates generating ordered collection 320 for sequence of changes 316.

Ordered collection 320 can be a collection of objects, such as an array. By storing sequence of changes 316 as ordered collection 320, webpage cloning system 204 enables the off-line demonstration 210 of FIG. 2 to reproduce visual change 308 while respecting a time-duration between each change in the sequence as determined from the timestamps. For example, each timestamp 318 in a series from 1 to next are subtracted from each to get a duration of how long to stay on a mutation in the sequence before playing the next mutation, thereby giving the sense of the timing used on live webpage 212.

In one illustrative example, recording change 306 to document object model 220 includes serializing change 306 into JSON object 322. Webpage cloning system 204 then locally stores JSON object 322 in association with identifier 324 that is unique to JSON object 322.

In one illustrative example, generating an off-line demonstration 210 of the webpage 212 includes linking an HTML element of document object model 220 to JSON object 322. A user interaction that changes the HTML element in off-line demonstration 210 reproduces the visual change 308 in off-line demonstration 210.

Custom wire up code is auto generated to power the simulation. In one illustrative example, the wire-up is a data object that ties together a visual element in thin-layer clone 208, a user action, and an action to preform (recording or function). Each wire up, or an array of wire ups, is saved in a JSON file alongside thin-layer clone 208.

For example, a wire up that calls a function "alert" upon a "click" of a visual element "Do a search" may take the form of the JSON object:

```
{
    "trigger_id": "71617",
    "wire_label": "Do a search",
    "event_type": "click",
    "event_handler_type": "Function",
    "handler_source_code": "alert('Hello World')"
}
```

The clone copy is saved to disk and can be reopened by end-users in any web browser, or reopened in the webpage cloning environment for further modification. Cloned webpages can be loaded back into the webpage cloning environment and wired up to visually replay the recorded interactions when needed. For example, when thin-layer clone 208 is opened for use by end user, webpage cloning system 204 loads and parses the JSON wire-up files. Webpage cloning system 204 dynamically generates pieces of source code in real-time to represent each of these wire-ups. source code representing these wire-ups is not hard-coded and stored on disk for thin-layer clone 208; rather, webpage cloning system 204 dynamically authors the source code on-the-fly as needed by off-line demonstration 210.

In one illustrative example, a state machine (not shown) is used to control flow between pages. Each page corresponds to a state of the document object model, with only one state being visible. The state cannot advance to the next one state unless conditions are met in the current state, as determined from the document object model. When the conditions are met, the state transitions to the next expected state. Redirects to the next state are handled based according to the wire-up, user-defined conditions and state changes.

The illustration of webpage cloning environment 200 in FIGS. 2-3 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

Figure 4:
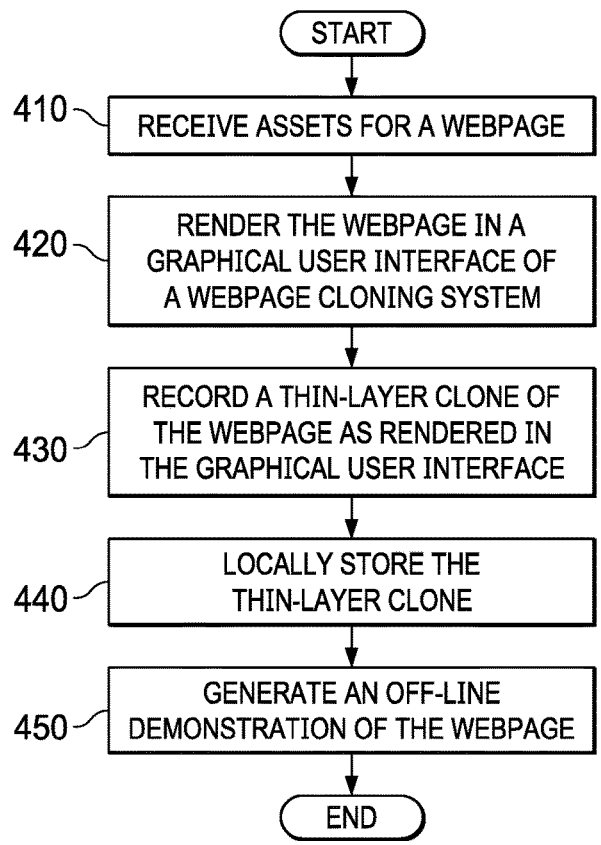
FIG. 4 is a flowchart of a process for cloning a webpage in accordance with an illustrative embodiment.

Turning next to FIG. 4, a flowchart of a process for cloning a webpage is depicted in accordance with an illustrative embodiment. The process in FIG. 4 can be implemented in hardware, software, or both. When implemented in software, the process can take the form of program code that is run by one or more processor units located in one or more hardware devices in one or more computer systems. For example, the process can be implemented in thin-layer cloning 202 in computer system 206 in FIG. 2.

The process begins by receiving webpage assets for a webpage (step 410). The process renders the webpage for display within a graphical user interface of a webpage cloning system (step 420).

In response to rendering the webpage, the process records a thin layer clone of the webpage as rendered for display in the graphical user interface (step 430). In one illustrative example, the thin layer clone can include a document object model generated from the webpage assets.

The process locally stores the thin layer clone (step 440). The process generates an off-line demonstration of the webpage (step 450), and terminates thereafter. The off-line demonstration is generated from the thin layer clone.

Figure 5:
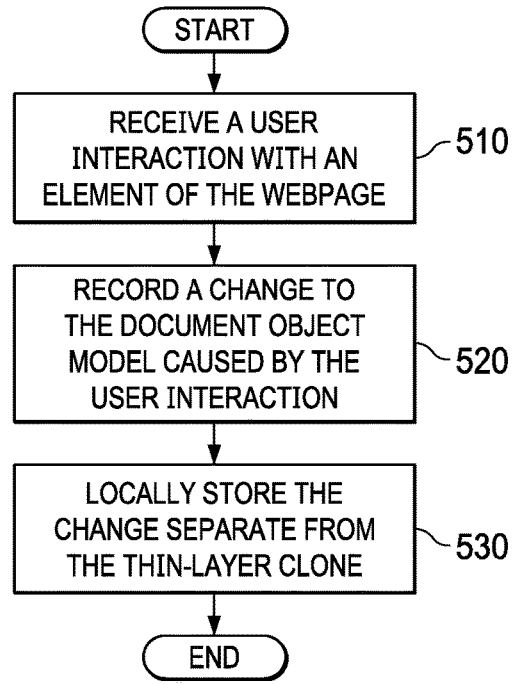
FIG. 5 is a flowchart of a process for cloning a webpage, including user interactions, in accordance with an illustrative embodiment.

Turning next to FIG. 5, a flowchart of a process for cloning a webpage, including user interactions is depicted in accordance with an illustrative embodiment. The process in FIG. 5 is an example of one manner in which the process of FIG. 4 can be implemented to include cloning user interactions in a webpage.

The process begins by receiving a user input interacting with an element of the webpage (step 510). The process records a change to the document object model caused by the user input (step 520). The change to the document object model produces a visual change to the webpage. The process then locally stores the change separate from the thin layer clone (step 530), and terminates thereafter.

Figure 6:
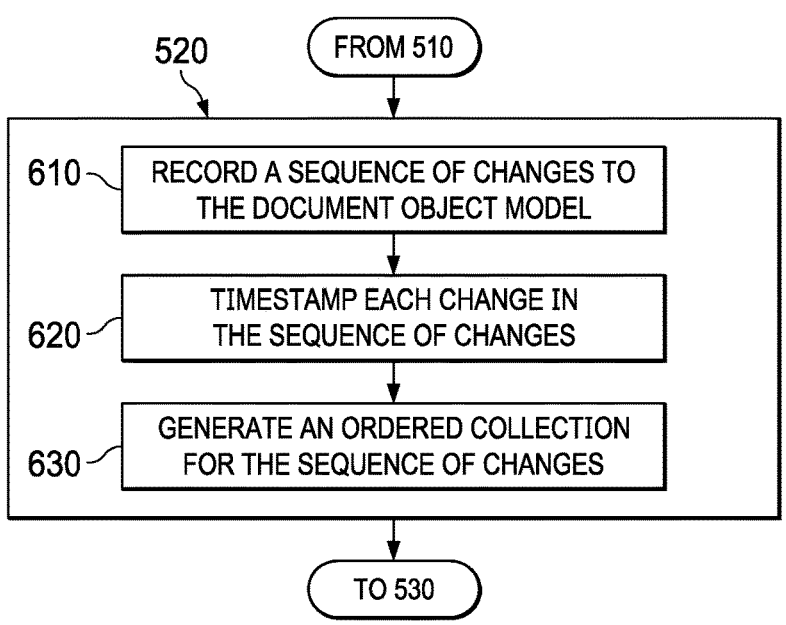
FIG. 6 is a flowchart of a first process for recording a change to a document object model in accordance with an illustrative embodiment.

Turning next to FIG. 6, a flowchart of a first process for recording a change to a document object model is depicted in accordance with an illustrative embodiment. The process in FIG. 6 is an example of one manner in which step 520 in FIG. 5 can be implemented.

Continuing from step 510 of FIG. 5, the process records a sequence of changes to the document object model (step 610). The process timestamps each change in the sequence of changes (step 620).

The process generates an ordered collection for the sequence of changes (step 630), and proceeds to step 530 of FIG. 5 thereafter. The order collection enables an off-line demonstration to reproduce a visual change in the graphical user interface while respecting a time duration of each change in the sequence as determined from the timestamps.

Turning next to FIG. 7, a flowchart of a second process for recording a change to a document object model is depicted in accordance with an illustrative embodiment. The process in FIG. 7 is an example of one manner in which step 520 in FIG. 5 can be implemented.

Continuing from step 510 of FIG. 5, the process records and identity of an HTML element in the document object model (step 710). The process records and initial state of the HTML element prior to the change to the document object model (step 720). The process records a change state of the HTML element after the change to the document object model (step 830), and proceeds to step 530 of FIG. 5 thereafter.

Turning next to FIG. 8, a flowchart of a second process for recording a change to a document object model is depicted in accordance with an illustrative embodiment. The process in FIG. 8 is an example of one manner in which steps 520 and 530 in FIG. 5 can be implemented.

Continuing from step 510, the process serializes the change into a JSON object (step 810). The process then locally stores the JSON object with a unique identifier (step 820), and proceeds to step 530 thereafter.

Turning next to FIG. 9, a flowchart of a process for generating an off-line demonstration of a webpage is depicted in accordance with an illustrative embodiment. The process in FIG. 9 is an example of one manner in which step 450 in FIG. 4 can be implemented.

Continuing from step 440 of FIG. 4, the process links the HTML element of the document object model to the JSON object (step 910), and terminates thereafter. a user interaction with the HTML element in the off-line demonstration reproduces the visual change in the off-line demonstration.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession can be performed substantially concurrently, or the blocks may sometimes be performed in the reverse order, depending upon the functionality involved. Also, other blocks can be added in addition to the illustrated blocks in a flowchart or block diagram.

Figure 10:
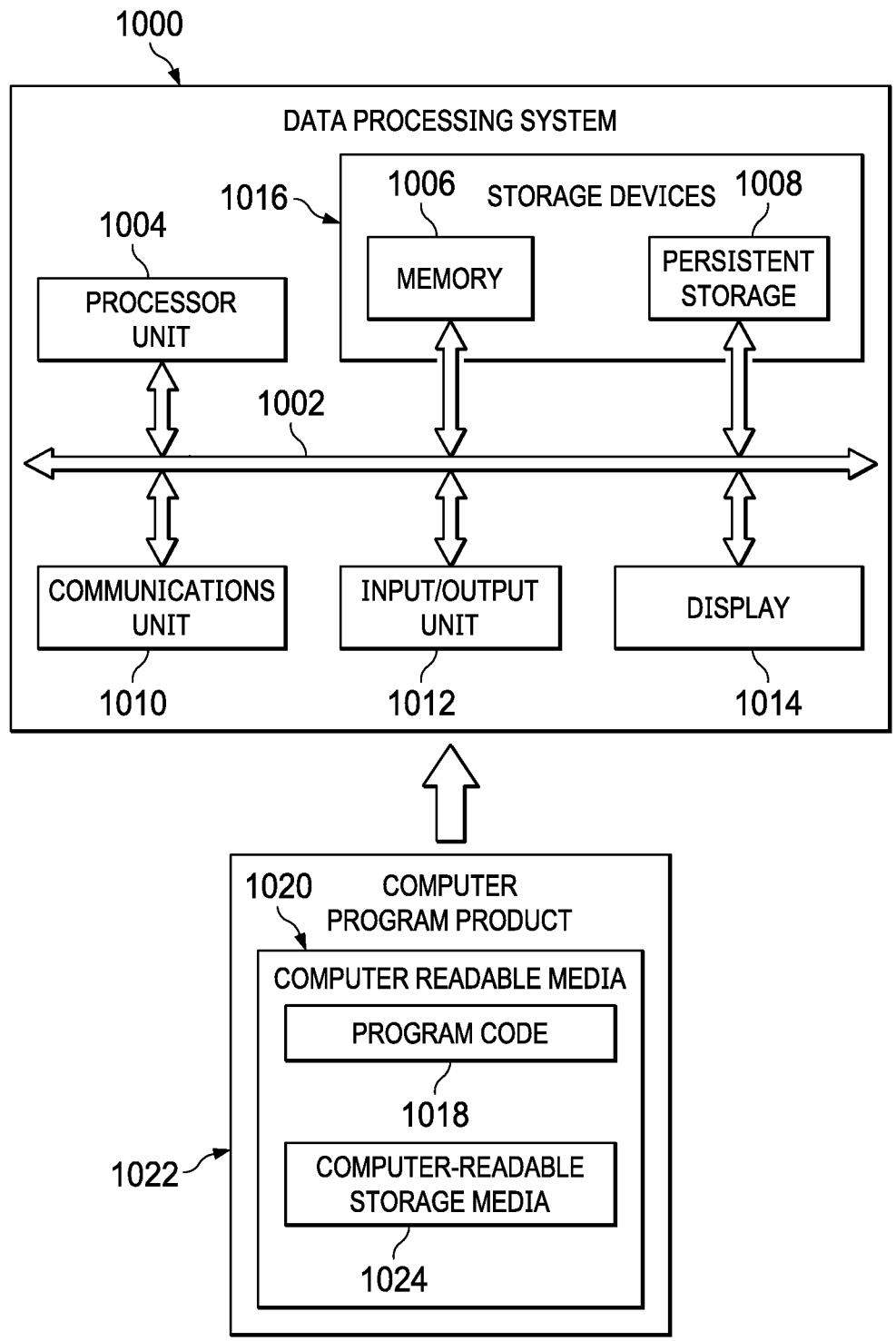
FIG. 10 is a block diagram of a data processing system in accordance with an illustrative embodiment.

Turning now to FIG. 10, a block diagram of a data processing system is depicted in accordance with an illustrative embodiment. Data processing system 1000 can be used to implement one or more data processing systems in computer system 206. In this illustrative example, data processing system 1000 includes communications framework 1002, which provides communications between processor unit 1004, memory 1006, persistent storage 1008, communications unit 1010, input/output (I/O) unit 1012, and display 1014. In this example, communications framework 1002 takes the form of a bus system.

Processor unit 1004 serves to execute instructions for software that can be loaded into memory 1006. Processor unit 1004 includes one or more processors. For example, processor unit 1004 can be selected from at least one of a multicore processor, a central processing unit (CPU), a graphics processing unit (GPU), a physics processing unit (PPU), a digital signal processor (DSP), a network processor, or some other suitable type of processor. Further, processor unit 1004 can may be implemented using one or more heterogeneous processor systems in which a main processor is present with secondary processors on a single chip. As another illustrative example, processor unit 1004 can be a symmetric multi-processor system containing multiple processors of the same type on a single chip.

Memory 1006 and persistent storage 1008 are examples of storage devices 1016. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1016 may also be referred to as computer-readable storage devices in these illustrative examples. Memory 1006, in these examples, can be, for example, a random-access memory or any other suitable volatile or non-volatile storage device. Persistent storage 1008 may take various forms, depending on the particular implementation.

For example, persistent storage 1008 may contain one or more components or devices. For example, persistent storage 1008 can be a hard drive, a solid-state drive (SSD), a flash memory, a rewritable optical disk, a rewritable magnetic tape, or some combination of the above. The media used by persistent storage 1008 also can be removable. For example, a removable hard drive can be used for persistent storage 1008.

Communications unit 1010, in these illustrative examples, provides for communications with other data processing systems or devices. In these illustrative examples, communications unit 1010 is a network interface card that connects data processing system 1000 to an external computer or external storage device via a network, for example, the Internet, a local area network, a wide area network and/or a wireless network.

Input/output unit 1012 allows for input and output of data with other devices that can be connected to data processing system 1000. For example, input/output unit 1012 may provide a connection for user input through at least one of a keyboard, a mouse, or some other suitable input device. Further, input/output unit 1012 may send output to a printer. Display 1014 provides a mechanism to display information to a user.

Instructions for at least one of the operating system, applications, or programs can be located in storage devices 1016, which are in communication with processor unit 1004 through communications framework 1002. The processes of the different embodiments can be performed by processor unit 1004 using computer-implemented instructions, which may be located in a memory, such as memory 1006.

These instructions are referred to as program code, computer usable program code, or computer-readable program code that can be read and executed by a processor in processor unit 1004. The program code in the different embodiments can be embodied on different physical or computer-readable storage media, such as memory 1006 or persistent storage 1008.

Program code 1018 is located in a functional form on computer-readable media 1020 that is selectively removable and can be loaded onto or transferred to data processing system 1000 for execution by processor unit 1004. Program code 1018 and computer-readable media 1020 form computer program product 1022 in these illustrative examples. In the illustrative example, computer-readable media 1020 is computer-readable storage media 1024.

In these illustrative examples, computer-readable storage media 1024 is a physical or tangible storage device used to store program code 1018 rather than a medium that propagates or transmits program code 1018. Computer-readable storage media 1024 may be, for example, but is not limited to, an electronic storage device, a magnetic storage device, an optical storage device, an electromagnetic storage device, a semiconductor storage device, or any suitable combination of the foregoing.

The term "non-transitory" or "tangible", as used herein, is a limitation of the medium itself (i.e., tangible, not a signal) as opposed to a limitation on data storage persistency (e.g., RAM vs. ROM). Computer-readable storage media 1024, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1018 can be transferred to data processing system 1000 using a computer-readable signal media. The computer-readable signal media can be, for example, a propagated data signal containing program code 1018. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 1020" can be singular or plural. For example, program code 1018 can be located in computer-readable media 1020 in the form of a single storage device or system. In another example, program code 1018 can be located in computer-readable media 1020 that is distributed in multiple data processing systems. In other words, some instructions in program code 1018 can be located in one data processing system while other instructions in in program code 1018 can be located in one data processing system. For example, a portion of program code 1018 can be located in computer-readable media 1020 in a server computer while another portion of program code 1018 can be located in computer-readable media 1020 located in a set of client computers.

The different components illustrated for data processing system 1000 are not meant to provide architectural limitations to the manner in which different embodiments can be implemented. In some illustrative examples, one or more of the components may be incorporated in or otherwise form a portion of, another component. For example, memory 1006, or portions thereof, may be incorporated in processor unit 1004 in some illustrative examples. The different illustrative embodiments can be implemented in a data processing system including components in addition to or in place of those illustrated for data processing system 1000. Other components shown in FIG. 10 can be varied from the illustrative examples shown. The different embodiments can be implemented using any hardware device or system capable of running program code 1018.

Thus, illustrative embodiments of the present invention provide a computer implemented method, computer system, and computer program product for cloning a webpage. Webpage assets for a webpage are received. Using the webpage assets, the webpage is rendered for display within a graphical user interface of a webpage cloning system. Responsive to rendering the webpage, a thin-layer clone of the webpage as rendered for display in the graphical user interface is recorded. An off-line demonstration of the webpage is then generated from the thin-layer clone.

In one or more illustrative examples of the present invention, one or more solutions are present that overcome an issue with the production of off-line simulations of online webpages. In other words, simulated demonstrations using thin-layer clones rely on simpler internal mechanisms to mimic live webpage interactions, and do not require replicating internal data structures or live sourcing of webpage assets. As a result, one or more solutions may provide an effect of enabling the creation of off-line demonstrations that mimic live webpage interactions, while also being light weight and less complex as compared to current techniques for creating off-line simulations of online webpages.

Further, because a thin-layer clone provides resources necessary to generate an off-line clone of a webpage, a webpage cloning system as described herein overcomes a technical problem of creating an off-line simulation demonstrating an online webpage, including reducing the overhead to build and maintain the off-line demonstration. An off-line demonstration generated from a thin-layer clone providing an emulation that faithfully mimics the structure and processes of webpage, but without requiring online retrieval of webpage assets. Furthermore, an off-line demonstration built from a thin-layer clone reduces the number of resources required by known systems using heavier and more complex demonstrations. In one illustrative example, generating an off-line demonstration from a thin-layer clone enables an organization to more quickly and easily develop off-line simulations of online products, which can lead to shorter development times earlier releases of finalized online products.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

The descriptions of the various embodiments of the present invention have been presented for purposes of illustration, but are not intended to be exhaustive or limited to the embodiments disclosed. Not all embodiments will include all of the features described in the illustrative examples. Further, different illustrative embodiments may provide different features as compared to other illustrative embodiments. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

What is claimed is:

1. A method for cloning a webpage, the method comprising:
   receiving webpage assets for a webpage;
   rendering the webpage within a graphical user interface of a webpage cloning system;
   responsive to rendering the webpage, recording a thin-layer clone of the webpage as rendered in the graphical user interface, wherein the thin-layer clone comprises a document object model generated from the webpage assets;
   locally storing the thin-layer clone; and
   generating an off-line demonstration of the webpage from the thin layer clone, wherein generating the off-line demonstration comprises:
      generating an initial view of the webpage;
      receiving a user input interacting with an element of the webpage;
      in response to the user input, recording a change to the document object model, wherein the change to the document object model produces a visual change to the webpage, and wherein recording the change to the document object model further comprises:
         recording a sequence of changes to the document object model;
         generating a timestamp for each change in the sequence of changes; and
         generating an ordered collection for the sequence of changes, wherein the ordered collection enables the off-line demonstration to reproduce the visual change while respecting a time-duration of each change in the sequence as determined from the timestamps;
      and
      locally storing the change to the document object model separate from the thin-layer clone.

2. The method of claim 1, wherein recording a change to the document object model further comprises:
   storing a current state of the document object model into a page of a state machine;
   storing a set of conditions to allow transition from the current state of the document object model to a new state of the document object model; and
   storing the new state of the document object model into a new page of the state machine.

3. The method of claim 1, wherein recording the change to the document object model further comprises:
   recording an identity of an HTML element in the document object model;
   recording an initial state of the HTML element prior to the change to the document object model; and
   recording a changed state of the HTML element after to the change to the document object model.

4. The method of claim 3, wherein recording a change to the document object model further comprises:
   serializing the change into a JSON object; and
   wherein locally storing the change further comprises:
      locally storing the JSON object in association with an identifier that is unique to the JSON object.

5. The method of claim 4, wherein generating an off-line demonstration of the webpage further comprises:
   linking the HTML element of the document object model to the JSON object, wherein a user interaction with the HTML element in the off-line demonstration reproduces the visual change in the off-line demonstration.

6. The method of claim 5, wherein generating an off-line demonstration of the webpage further comprises:
   generating a wire-up, wherein the wire-up is a data object linking a visual element in the thin-layer clone, a user action, and an action to be performed in response to the user action; and
   locally storing the wire-up.

7. A webpage cloning system comprising:
   a computer system; and
   a thin-layer cloning document verifier in the computer system, wherein the thin-layer cloning document verifier operates to:
      receive webpage assets for a webpage;
      render the webpage within a graphical user interface of a webpage cloning system;
      responsive to rendering the webpage, record a thin-layer clone of the webpage as rendered in the graphical user interface, wherein the thin-layer clone comprises a document object model generated from the webpage assets;
      locally store the thin-layer clone; and
      generate an off-line demonstration of the webpage from the thin layer clone, wherein generating the off-line demonstration comprises operations to:
         generate an initial view of the webpage;
         receive a user input interacting with an element of the webpage;
         in response to the user input, record a change to the document object model, wherein the change to the document object model produces a visual change to the webpage, and wherein recording the change to the document object model further comprises operations to:
            record a sequence of changes to the document object model;

generate a timestamp for each change in the sequence of changes; and generate an ordered collection for the sequence of changes, wherein the ordered collection enables the off-line demonstration to reproduce the visual change while respecting a time-duration of each change in the sequence as determined from the timestamps;

and locally store the change to the document object model separate from the thin-layer clone.

8. The webpage cloning system of claim 7, wherein recording a change to the document object model, the thin-layer cloning document verifier further operates to:

store a current state of the document object model into a page of a state machine;

store a set of conditions to allow transition from the current state of the document object model to a new state of the document object model; and store the new state of the document object model into a new page of the state machine.

9. The webpage cloning system of claim 7, wherein in recording the change to the document object model, the thin-layer cloning document verifier further operates to:

record an identity of an HTML element in the document object model;

record an initial state of the HTML element prior to the change to the document object model; and record a changed state of the HTML element after to the change to the document object model.

10. The webpage cloning system of claim 9, wherein in recording a change to the document object model, the thin-layer cloning document verifier further operates to:

serialize the change into a JSON object; and wherein in locally storing the change, the thin-layer cloning document verifier further operates to:

locally store the JSON object in association with an identifier that is unique to the JSON object.

11. The webpage cloning system of claim 10, wherein in generating an off-line demonstration of the webpage, the thin-layer cloning document verifier further operates to:

link the HTML element of the document object model to the JSON object, wherein a user interaction with the HTML element in the off-line demonstration reproduces the visual change in the off-line demonstration.

12. The webpage cloning system of claim 11, wherein generating an off-line demonstration of the webpage, the thin-layer cloning document verifier further operates to:

generate a wire-up, wherein the wire-up is a data object linking a visual element in the thin-layer clone, a user action, and an action to be performed in response to the user action; and locally store the wire-up.

13. A computer program product for cloning a webpage, the computer program product comprising:

a computer readable storage media;

program code, stored on the computer readable storage media, for receiving webpage assets for a webpage;

program code, stored on the computer readable storage media, for rendering the webpage within a graphical user interface of a webpage cloning system;

program code, stored on the computer readable storage media, for recording a thin-layer clone of the webpage as rendered in the graphical user interface in response to rendering the webpage, wherein the thin-layer clone comprises a document object model generated from the webpage assets;

program code, stored on the computer readable storage media, for locally storing the thin-layer clone; and program code, stored on the computer readable storage media, for generating an off-line demonstration of the webpage from the thin layer clone, wherein generating the off-line demonstration comprises:

program code, stored on the computer readable storage media, for generating an initial view of the webpage;

program code, stored on the computer readable storage media, for receiving a user input interacting with an element of the webpage;

program code, stored on the computer readable storage media, for recording a change to the document object model in response to the user input, wherein the change to the document object model produces a visual change to the webpage, and wherein recording the change to the document object model further comprises:

program code, stored on the computer readable storage media, for recording a sequence of changes to the document object model;

program code, stored on the computer readable storage media, for generating a timestamp for each change in the sequence of changes; and program code, stored on the computer readable storage media, for generating an ordered collection for the sequence of changes, wherein the ordered collection enables the off-line demonstration to reproduce the visual change while respecting a time-duration of each change in the sequence as determined from the timestamps;

and program code, stored on the computer readable storage media, for locally storing the change to the document object model separate from the thin-layer clone.

14. The computer program product of claim 13, wherein the program code for recording a change to the document object model further comprises:

program code for storing a current state of the document object model into a page of a state machine;

program code for storing a set of conditions to allow transition from the current state of the document object model to a new state of the document object model; and program code for storing the new state of the document object model into a new page of the state machine.

15. The computer program product of claim 13, wherein the program code for recording the change to the document object model further comprises:

program code for recording an identity of an HTML element in the document object model;

program code for recording an initial state of the HTML element prior to the change to the document object model; and program code for recording a changed state of the HTML element after to the change to the document object model.

16. The computer program product of claim 15, wherein the program code for recording a change to the document object model further comprises:

program code for serializing the change into a JSON object; and wherein the program code for locally storing the change further comprises:

program code for locally storing the JSON object in association with an identifier that is unique to the JSON object.

17. The computer program product of claim 16, wherein the program code for generating an off-line demonstration of the webpage further comprises:
- program code for linking the HTML element of the document object model to the JSON object, wherein a user interaction with the HTML element in the off-line demonstration reproduces the visual change in the off-line demonstration.

18. The computer program product of claim 17, wherein the program code for generating an off-line demonstration of the webpage further comprises:
- program code for generating a wire-up, wherein the wire-up is a data object linking a visual element in the thin-layer clone, a user action, and an action to be performed in response to the user action; and
- program code for locally storing the wire-up.

* * * * *